INVENTORS
ERNEST BYRON
BERNARD O. QUINN

BY Stowell & Stowell
ATTORNEYS

INVENTORS
ERNEST BYRON
BERNARD O. QUINN

BY Stowell & Stowell
ATTORNEYS

INVENTORS
ERNEST BYRON
BERNARD O. QUINN

BY Stowell & Stowell
ATTORNEYS 3,245,054

INDUCTIVE MEMORY SYSTEM WITH SELECTIVELY OPERABLE INDUCTIVE COUPLING

Ernest Byron, Rockville, and Bernard O. Quinn, Hanover, Md., assignors to International Business Machines Corporation, Armonk, N.Y., a corporation of New York Filed Dec. 18, 1963, Ser. No. 331,548
3 Claims. (Cl. 340—173)

This application is a continuation-in-part of application Serial No. 121,973, filed July 5, 1961, now abandoned.

This invention relates in general to digital memory systems and more particularly to a semi-permanent random access read-only memory.

Of prime consideration in electronic data processing is the ability to easily store information, take information out of storage, and completely remove previously stored information so that new information may be stored using the same equipment. This is especially true of random access equipment which finds its greatest application in storage of large quantities of independent data.

Mediums for storage include magnetic drums and discs, magnetic tape, magnetic memory cores, various delay line configurations, and other more cumbersome systems. Present day random access memories are primarily of the magnetic core type. Magnetic cores can retain information indefinitely and recall it in a few millionths of a second. Paper tapes and punched cards have also experienced wide use and are efficient memories in the sense that they are in a physical state which can retain symbolic data for long periods with no need for reshaping and strengthening the record. However, the read-out from this type of memory is comparatively slow and the information stored in the memory cannot be readily changed.

The general application of electronic computers to business, commerce, and industry depends to a great extent on the development of a random access memory which is large and efficient, and one which readily provides for ease of stored data alteration. The larger the capacity for data storage, the higher is the cost to make this data rapidly available. Present day memory systems have a cost per character which may run as high as a dollar or more. This extremely high cost makes the computer system less attractive than even the old fashioned card file for many applications.

High speed read-only memories can be grouped into two main classes: memories in which a data change is accomplished by mechanical means and memories in which a data change is done electrically. The ordinary memory core works on the latter principle which is both easier and faster than most mechanical means. However, a serious limitation of the ordinary memory core is that during the reading process the core is erased so that each time a core is read the stored information must be rewritten into it. This problem was somewhat alleviated with the introduction of the multi-apertured core which allows read-out without erasing; however, this method is extremely costly. Because of the high cost per bit, the multi-apertured core is very impractical for high volume memories.

In an attempt to reduce the cost per bit wired memories were introduced. These memories were still rather costly but worst of all data contained therein could only be changed mechanically. Data change proved both time consuming and expensive in these memories since these changes usually required the relocation of soldered connections.

It is, therefore, a prime object of the present invention to provide a semi-permanent inductive memory system in which the stored data may be easily and inexpensively changed.

Another object of the invention is to provide a data storage system which is simple, efficient and inexpensive.

Still another object of the invention is to provide a data storage system which has a high signal to noise ratio at low signal levels.

A further object of the invention is to provide a data storage system which is compact and has a high storage capacity.

Still a further object of the invention is to provide a data memory system requiring simple driving and sensing equipment.

An additional object of the invention is to provide a semi-permanent inductive memory system in which the inductive coupling between an input element and an output element may be changed from maximum to minimum by changing the direction of current flow in the drive element.

These and other objects and many of the attendant advantages of this invention will be readily appreciated as the same becomes better understood by reference to the following detailed description when considered in connection with the accompanying drawings, wherein.

Magnetic cores are valuable as storage devices because of their ability to hold the direction in which they have been magnetized. In digital computer language, the core is said to contain a one if it is magnetized in one direction, and a zero if it is magnetized in the other direction. In this manner a group of magnetic cores can hold a pattern of ones and zeros which make up a binary number. This method of storage although quite workable has serious limitations. The large number of cores required results in an expensive system in which stored information may be lost if care is not taken.

In contrast with this and other magnetic systems the invention depends on a coupling or lack of coupling of a signal from an input line to an output line to provide the necessary ones and zeros for binary storage. The invention generally comprises a changeable data element and semi-permanent storage system which utilizes transformer action to couple information to the output circuit each time a particular input line is pulsed. The storage in this system is accomplished by permanently orienting the flux paths of two printed circuit conductors, so that if a one is wanted, the conductors will be in parallel and if a zero is wanted, the conductors will be perpendicular to each other.

Figure 1:
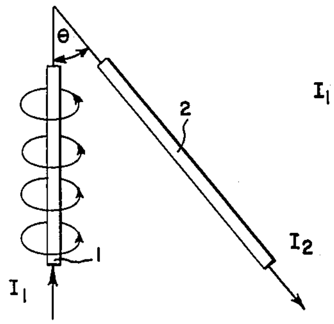
FIG. 1 is a diagrammatic illustration of the principle of inductive coupling.

The principle involved stems from the relationship for the induced E.M.F. between a pair of straight conductors. FIG. 1 shows a pair of conductors 1 and 2 arranged in a common plane at an angle $\theta$ to each other. A current $I_1$ applied to conductor 1 will cause a similar current $I_2$ to be induced in conductor 2 in a direction opposite to current $I_1$. This is a direct application of Lenz's law. The amount of current induced in conductor 2 will directly depend upon the orientation of conductor 2 with respect to conductor 1 and will vary according to cos $\theta$. Thus when $\theta=0$, cos $\theta$ will equal 1 and $I_2$ will be maximum. When $\theta=90°$, cos $\theta$ will equal 0 and $I_2$ will be zero.

In applying the above principle to a computer memory, if conductor 1 were an input conductor and conductor 2 an output conductor, ones and zeros could be produced in the output conductor by merely switching the orientation of conductor 2 between $\theta=0$ and $\theta=90°$ with respect to conductor 1, or vice versa.

Figure 2:
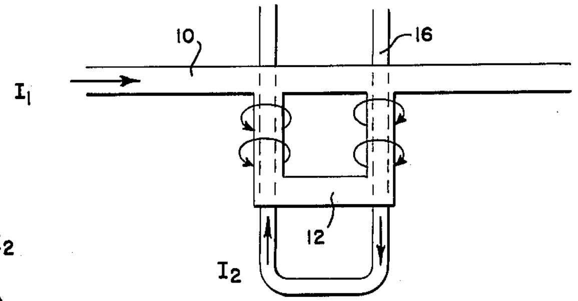
FIG. 2 is a schematic view of a simplified form of the invention.

FIG. 2 shows a simplified form of the invention. Line 10 is the primary drive line and has connected to it along its length a driving loop 12. The sense or output circuit for the invention is in the form of a long loop 16 which is oriented directly beneath the sides of the driving loop and in super-imposed relationship thereto. The drive and sense loops are electrically isolated from but magnetically coupled to each other.

When a current pulse $I_1$ is inserted in the drive line 10, it will travel the full length of the drive line and also flow through the driving loops when possible. This current pulse will cause a magnetic field to build up around the various conductors of the driving line and driving loops. However, since main drive line 10 is perpendicular to the sense loop 16, no current will be induced in the sense loop due to the current flow in this drive line. But the drive loops have sides which are parallel to the sense loops. Current flow through loop 12 will induce a similar current flow in sense loop 16 thereby providing an output pulse in line 16.

Figure 3:
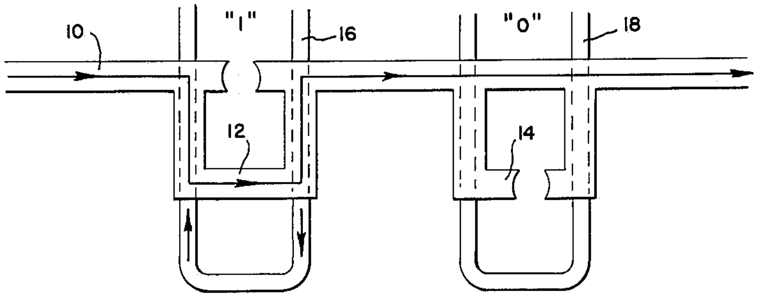
FIG. 3 is a schematic view of a simplified form of the invention having a "one" and a "zero" stored therein.

FIG. 3 shows a simplified form of the invention with a one and a zero stored therein. Two driving conductive loops 12 and 14 and two sense loops 16 and 18 are provided, one for each bit. Loop 14 has been broken at its lower end by punching a hole therein. Line 10 is also broken above loop 12. This automatically stores a zero in loop 18 and a one in loop 16 in a manner now to be described.

A current pulse applied to driving line 10 will pass through driving loop 12 thereby inducing a pulse or one in the output of sense loop 16. However, because loop 14 has been broken, the input current pulse will not travel through the loop but will be confined to passage through main line 10. As already explained, since the coupling between line 10 and the output loops is essentially zero, no output will appear in loop 18. This loop is thus said to contain a zero. In this manner digital data in the form of ones and zeros can be simply and permanently stored.

Figure 4:
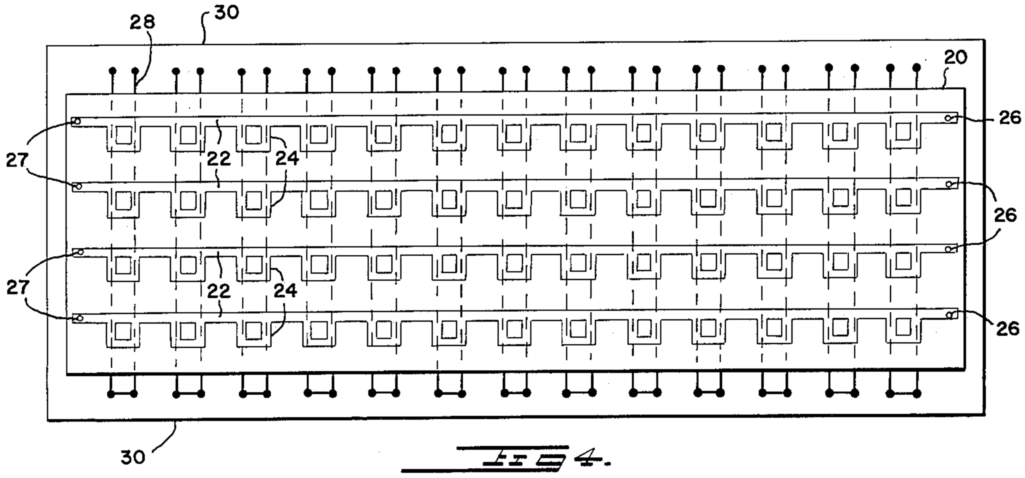
FIG. 4 is an elevational view of a memory built according to the invention.

A memory may typically be constructed according to the invention by providing an input driving loop for each bit to be stored. Such a system is shown in FIG. 4. The board 20 contains a plurality of printed conductive lines 22 each of which represents a character or word. The drive lines 22 in turn each contain a similar number of driving loops 24 corresponding to the number of bits in each word or character. Connections are made to the terminals 26 of lines 22 from a suitable driving source, as discussed hereinafter, in a non-permanent manner so that the boards may be removed from the system without breaking and re-making permanent physical connections. Also, terminals 27, similar to the terminals 26, are provided at the other end of the board 20. Board 20 may be the size of the standard punch card making possible the use of modified standard punch equipment to write data in the board or it may be smaller than standard for purposes of compactness.

The output or sense loops 28 are printed on a second board 30. These sense loops are so oriented on board 30 that when boards 20 and 30 are placed together in the proper manner the individual sense loops 28 will be superimposed upon a corresponding driving loop 24 in each line 22. Since no information is stored on these output boards 30, they may be permanently connected in the system. This materially reduces the number of temporary or non-permanent connections to be made to the memory. It has also been found that by placing the memory between sheets of soft iron or other ferromagnetic material, the inductive coupling between the drive and sense circuits is greatly enhanced.

The individual memory planes are built one upon another to form memory stacks and the stacks may in turn be combined to produce a large capacity memory system. The system is built in modular form, allowing free access to the individual punch cards so that these cards may be easily removed and replaced by other cards having different data recorded thereon. The invention therefore eliminates the need for rewiring or resetting of magnetic cores by providing individual removable data cards for data storage.

Figure 5:
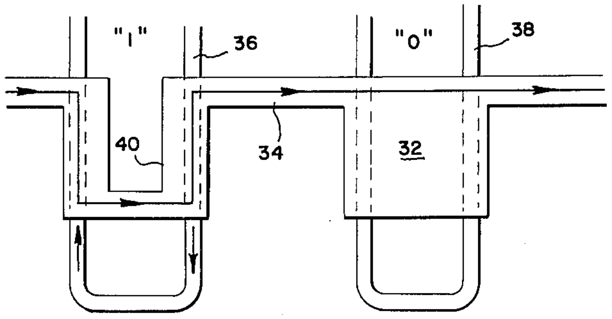
FIG. 5 is a schematic view of a modified form of the invention having a "one" and a "zero" stored therein.

FIG. 5 shows a modified version of the driving loop structure illustrated in FIG. 3. The drive loops of the modified version are typically formed of a plurality of initially solid areas or elements 32 interconnected by a drive line 34. Normally, when a current pulse is applied to the drive line 34 the current will flow along a path which is substantially perpendicular to the associated sense loops 36 and 38. Therefore, no current will be induced by the drive line current in the sense loops and therefore will represent a plurality of zeros.

However, by punching out a portion of the solid areas 32 as shown generally at 40, the current pulse in the drive line will be caused to travel along a path which is substantially parallel to the associated sense loop 36 enabling a current to be induced therein.

Accordingly, in placing information on the form of the invention of FIG. 5, the assembly needs to be punched only when a 1 bit is desired.

Figure 6:
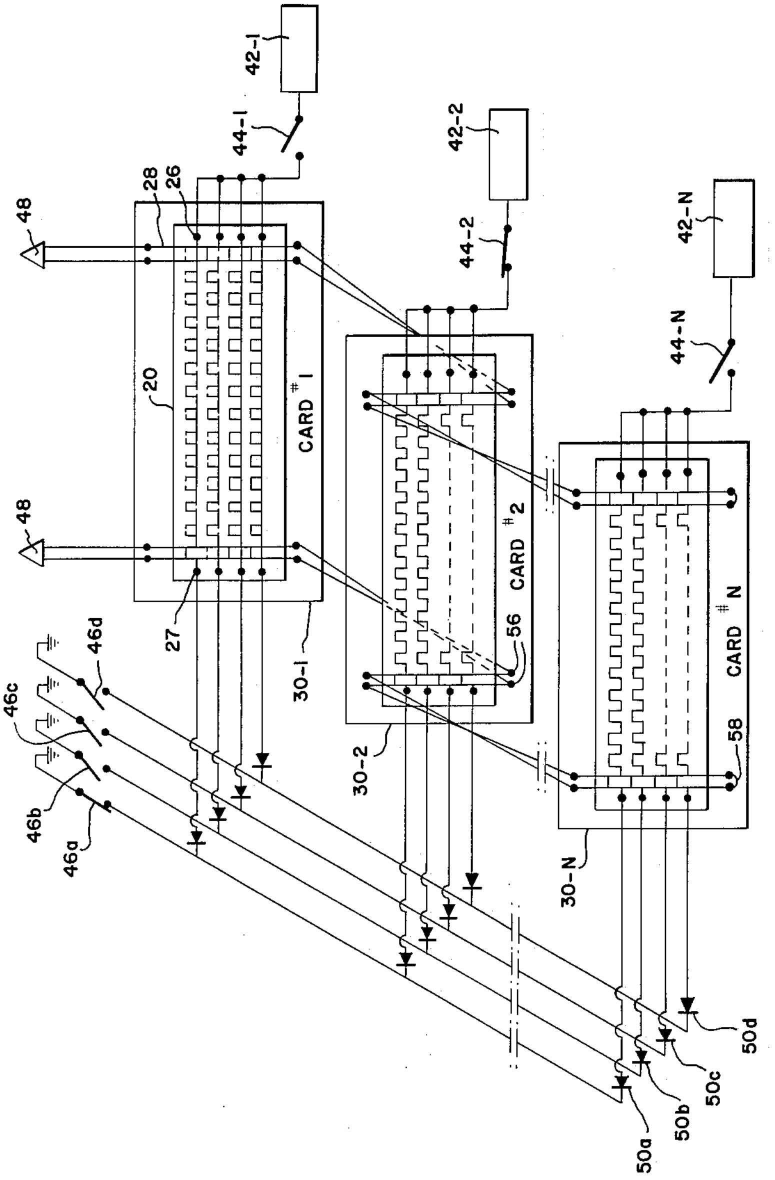
FIG. 6 is a schematic illustration showing memory system and associated circuits by which information may be "read" out of the memory.

A typical memory system incorporating the invention is shown in FIG. 6 with an associated circuit by which the information stored on the individual memory units may be read out. In FIG. 6 there is shown an N-card system wherein the individual cards 20, 30 (as illustrated in FIG. 4) are typically stacked side-by-side. As shown in FIG. 6, there is a driver or power source 42–1, 42–2 . . . 42–N for each card 20 suitably coupled to the drive line inputs 26 through suitable drive switches 44–1, 44–2 . . . 44–N. The opposite sides of the drive lines are individually coupled to ground through suitable switching means **46*a*, 46*b*, 46*c* and 46*d* and diodes 50*a*, 50*b*, 50*c* and 50*d* which function to limit the current flow in only one direction. In certain instances it is possible to eliminate the diodes from the system because of the high values of signal-to-noise ratio obtainable. Corresponding output or sense loops 28 of adjacent memory units are coupled together through suitable conductor means 60 to appropriate sensing amplifiers 48**.

The operation of the system can best be explained by the following example. Assume that it is desired to examine the information in the top row of drive loops 24 in card number 2. It is necessary, to accomplish this end, to momentarily close the left hand word switch **46*a* and the drive switch 44–2 associated with card number 2. The driver 42–2** will generate a current pulse which will follow a path through the top drive line *a* of card number 2 since it is the only complete circuit available. The contents of the line *a* are then sensed by the sense amplifiers 48. Accordingly, it is possible to examine any drive line of the individual memory cards by merely closing the appropriate drive and word switches, either electrically or mechanically.

FIG. 6 shows an N-card memory system wherein individual cards 20 are placed in a side-by-side arrangement and corresponding output or sense loops 28 of adjacent memory units are coupled together through suitable conductor means. It will be apparent from FIG. 6 that a continuous output loop 28 extending over the several cards is thus provided by such conductor means for connection to the appropriate sensing amplifier 48. Such an extended sensing loop is accomplished by the provision of an extra set of terminals 56 at the bottom edge of each of the boards 30 which carry the printed conductors 28. Thus, while the lowermost N card illustrated in FIG. 6 has a closed loop segment 58 for each of the vertical conductor pairs at the bottom edge of the second board 30, all as previously described more particularly with respect to FIG. 4, it will be apparent that all of the intervening cards, No. 1, No. 2, etc., lack a direct conductive bridge or short-circuiting arrangement. This suggests a further modification of the invention which is illustrated in FIG. 7 of the drawings.

Figure 7:
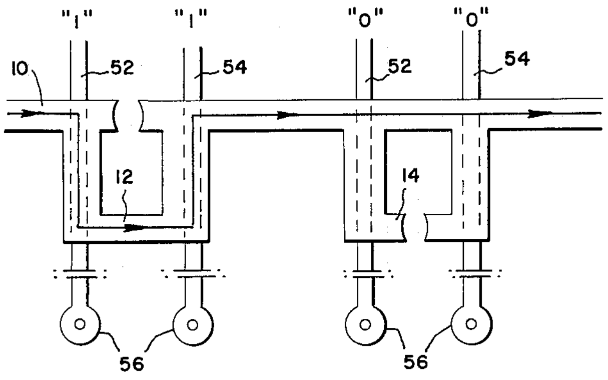
FIG. 7 is a schematic view of a further modified form of the invention having a one and a zero stored therein.

As shown in FIG. 7, the previously described closed output or sensing loop has ben modified so that there is no longer a closed or short-circuit connection between the pairs of adjacent conductors 52 and 54. It will be apparent to those skilled in the art that a maximum inductive coupling factor is realized when a closed circuit sensing loop 16 is provided as shown in FIG. 3. In such figure, the additive coupling effect of the two arms of a loop 12 is utilized and there will be a current induced in each underlying secondary conductor of loop 16 in the direction opposite to the current flow in the primary conductor. Although the magnitude of induced current as sensed at any terminal 56 in FIG. 7 will be approximately one-half of that available from the closed-loop arrangements illustrated in FIGS. 3 through 6, it will be immediately apparent that by not closing a shunt 58 between the parallel conductors 52 and 54 the output sensing paths and, therefore, the capacity available have been increased in this modification of the invention.

The embodiment of the invention illustrated in FIG. 7 permits an even greater flexibility in the performance of standard data processing operations using the inductive memory card. It is not believed that a specific example of the use of the non-closed loop or parallel conductor secondary sensing arrangement 52, 54 need be illustrated as it will be readily apparent from a consideration of FIG. 6 and a comparison of the simplified schematic views of FIGS. 3 and 7.

Efficient operation of the system of FIG. 6 requires a high signal to noise ratio and extremely good discrimination between ones and zeros. Since the system basically provides bit discrimination by effectively switching from maximum to minimum inductive coupling rather than attempting to accomplish this result artificially by distorting the orientation of the flux about the line, the ability of the system to differentiate between dissimilar bits will be very high. Signal to noise ratios in excess of 20 to 1 have been achieved. Because of the high signal to noise ratios attainable, a reduction of the drive requirements is possible.

Another desirable characteristic of the system is its inherently low impedance levels. Because of the transformer type construction of the system, the output impedance is within a range where coupling to a matched load is possible resulting in high output voltages. This again will allow a reduction of the drive requirements without sacrifice in system efficiency. Also the ability to match the system to the drive circuit provides for less susceptibility of the system to noise generated in this circuit.

Any of the standard data processing operations can be performed using the inductive memory card. In addition the system is highly applicable to arithmetic operations which may be accomplished on a stored table basis and is also applicable to program control, logic storage, machine tool control, video display and control, and hundreds of other applications.

Although FIG. 6 illustrates one typical memory system and associated circuitry whereby stored information on individual memory cards may be read out selectively, additional data processing operations are possible utilizing the same memory cards of the invention but with a different arrangement of the associated energizing and sensing circuits.

By means of the associated circuit arrangements illustrated in FIG. 6, a different mode of operation may be achieved by the total energization of the entire card. All of the contacts 27 and all of the contacts 26 may be energized by the appropriate operation of switches 44 and 46. In such a mode of operation, it is possible to make accumulative or summing readings on the sensing loops 28. Thus, a pseudo analog readout may be obtained by virtue of the number of ones and zeros which have been stored on the input cards 20 by the predetermined punching operations as previously described and illustrated in FIG. 3. In any vertical line of the plural input loops 27–26 of an individual memory card as read out on a single output loop 28, there will be a definite step function output coupled thereto corresponding to the number of holes punched in that particular vertical line. Thus, if all of the input loops are punched to show a one as provided at loop 12 of FIG. 3, the analog signal output on the sensing loop 28 will be a maximum. On the other hand, a minimum analog output would be secured when all of the input or driver loops 27–26 were punched in the zero configuration as illustrated for an inidvidual loop in the enlarged representation illustrated in FIG. 3 at 14.

The foregoing description has made reference to a memory device of a stacked module configuration which utilizes a plurality of removable and interchangeable cards 20 in association with a like number of fixed cards 30. Although the use of fixed cards presents certain advantages by reducing the number of non-permanent connections and their attendant contact problems as already discussed, in other situations it may be desirable to provide the write-in and read-out functions on a single printed circuit board.

Figure 8:
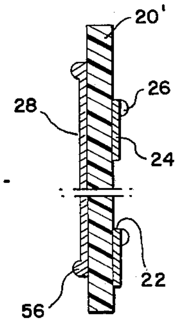
FIG. 8 is a fragmentary cross-sectional view of a modified form of the memory illustrated in FIG. 4.

FIG. 8 illustrates a modified form of the invention wherein the driving loops 27–26 and sensing paths 28 or 52, 54 are carried or mounted on a single card 20′. Printed circuit techniques may be employed, and the card size may be that of a standard punch card as in the previously described forms of the invention.

FIG. 8 is a cross-sectional elevation view of the single card 20′. By comparison with the form of the invention illustrated in FIG. 4, it will be obvious that card 20′ is a unitary assemblage which provides, in a single removable circuit element, the combined properties of an individual pair of cards 20, 30. The insulating body of card 20′ both separates and supports two different printed circuits. The loops 24 are carried on one face, and loops 28 or their modified arrangement as parallel conductors 52, 54 are carried on the opposite card face.

The modification shown in FIG. 8 may be utilized in practicing all of the previously described forms of the invention. Thus, the memory information of ones and zeros may be cut or punched as in FIGS. 3 and 4; the alternative tab configuration shown in FIG. 5 can be employed; a plurality of cards 20′ may be assembled in module form to provide a memory arrangement or analog function using stacked cards and associated circuits as in FIG. 6; and the increased data storage feature of FIG. 7 may be utilized.

It will be understood that conductors on the opposite faces of card 20′ will be in the same relative vertical alignment as in the two card forms of the invention shown in FIG. 4, and therefore the coded data punching or cutting of the conductive loops on one face of the card will not interrupt the circuit paths on the opposite card face.

Comparison with other types of semi-permanent memories shows that the inductive memory card far outperforms those other systems in ability to selectively change memory information. Changes possible under the invention by replacing one card would correspond to a full program of change in other memories.

It should be understood that the straight line configuration of the printed circuit lines described according to the invention is not a critical limitation but has been adopted only to achieve optimum spacing. Any configuration or variation which will effectively permit a switching of the drive currents as herein described must be considered as within the scope of the invention.

It should be further understood that while reference has been made to a primary "input member" or drive line having a plurality of lines or possible paths therein, and "output members" or sense loops selectively inductively coupled thereto; such designation of "input" and "output" has been by way of example only in order to permit the invention to be more readily understood. Obviously, since the invention relies upon the effect of mutual inductance, the input and output roles are reversible and interchangeable.

In accordance with the provisions of the patent statutes, we have explained the principle and mode of operation of our invention and have illustrated and described what we now consider to represent its best embodiments. However, we desire to have it understood that, within the scope of the appended claims, the invention may be practiced otherwise than as specifically illustrated and described.

We claim:

1. An inductive read-only memory comprising:

a set of driving conductors, portions of which are selectively interrupted to represent stored binary information;

and a set of sensing conductors arranged in a generally transverse nonconductive relationship with said set of driving conductors;

each of said driving conductors having the following predetermined portions thereof disposed in proximity to each of said sensing conductors:

a first portion adapted, when not interrupted, to provide a conductive path for driving current having a direction substantially at right angles to the direction in which the associated sensing conductor extends, and a second portion adapted in part to provide a conductive path for driving current having a direction substantially parallel with the direction in which the associated sensing conductor extends and being so related inductively to said sensing conductor as to enable a particular output voltage to be induced in said sensing conductor when said second portion is conducting substantially all of the current flowing through said driving conductor, said first and second portions being so arranged that when said first portion is interrupted, said second portion then conducts substantially all of the current flowing through said driving conductor.

2. A read-only memory as set forth in claim 1 wherein said first and second portions are alternatively interruptible, whereby one of said conductive paths is disabled to represent a predetermined binary digit and the other of said conductive paths is disabled to represent the opposite binary digit.

3. A read-only memory as set forth in claim 1 wherein only said first portion is selectively interruptible, whereby both of said conductive paths are maintained for representing one binary digit, and only the second of said conductive paths is maintained for representing the opposite binary digit.

References Cited by the Examiner

UNITED STATES PATENTS 3,130,388 4/1964 Renard ____________ 340—173

OTHER REFERENCES

Bruce et al.: "High-Speed Reader," IBM Technical Disclosure Bulletin, vol. 4, No. 1, June 1961, page 4.

IRVING L. SRAGOW, *Primary Examiner.*